United States Patent
Kimoto (10) Patent No.: US 9,010,483 B2
(45) Date of Patent: Apr. 21, 2015

(54) POWER STEERING DEVICE AND BACKLASH ADJUSTER

(71) Applicant: Hitachi Automotive Systems Steering, Ltd., Hiki-gun, Saitama (JP)

(72) Inventor: Susumu Kimoto, Atsugi (JP)

(73) Assignee: Hitachi Automotive Systems Steering, Ltd., Hiki-gun (JP)

( * ) Notice: Subject to any disclaimer, the term of this patent is extended or adjusted under 35 U.S.C. 154(b) by 0 days.

(21) Appl. No.: 14/109,144

(22) Filed: Dec. 17, 2013

(65) Prior Publication Data

US 2014/0174843 A1 Jun. 26, 2014

(30) Foreign Application Priority Data

Dec. 25, 2012 (JP) ................................. 2012-281044

(51) Int. Cl.
   *B62D 7/15* (2006.01)
   *F16H 57/12* (2006.01)
   *B62D 5/04* (2006.01)

(52) U.S. Cl.
   CPC .............. *F16H 57/12* (2013.01); *B62D 5/0409* (2013.01); *B62D 5/0424* (2013.01)

(58) Field of Classification Search
   USPC ........................................... 180/444; 74/409
   See application file for complete search history.

(56) References Cited

U.S. PATENT DOCUMENTS

| 6,491,131 | B1 * | 12/2002 | Appleyard | 180/444 |
| 6,527,642 | B1 * | 3/2003 | Arai et al. | 464/104 |
| 2007/0062754 | A1 * | 3/2007 | Kim et al. | 180/444 |
| 2007/0102228 | A1 * | 5/2007 | Shiina et al. | 180/444 |
| 2008/0006472 | A1 * | 1/2008 | Song et al. | 180/444 |
| 2009/0266640 | A1 * | 10/2009 | Oshima et al. | 180/444 |
| 2010/0116582 | A1 * | 5/2010 | Rho et al. | 180/444 |
| 2014/0008142 | A1 * | 1/2014 | Yoshikawa et al. | 180/444 |

FOREIGN PATENT DOCUMENTS

JP          2004-345444 A          12/2004

* cited by examiner

*Primary Examiner* — Tony Winner
(74) *Attorney, Agent, or Firm* — Foley & Lardner LLP (57) ABSTRACT

In a power steering device employing both a worm speed reducer and a backlash adjuster for a worm gear of the speed reducer, the backlash adjuster has a slider configured to be movable in a longitudinal direction of a worm shaft, and a biasing member configured to bias the slider toward one side of the longitudinal direction of the worm shaft. Also provided is a guide member configured to bias the worm shaft in a direction for meshing with a worm wheel by a movement of the worm shaft in the meshing direction that the worm shaft approaches a rotation center of the worm wheel with a movement of the slider toward the one side of the longitudinal direction, and also configured to restrict a movement of the worm shaft in a direction opposite to the meshing direction of the worm shaft.

20 Claims, 7 Drawing Sheets

POWER STEERING DEVICE AND BACKLASH ADJUSTER

TECHNICAL FIELD

The present invention relates to a power steering device, and specifically to a backlash adjuster configured to adjust backlash by pressing a worm against a worm wheel.

BACKGROUND ART

In recent years, there have been proposed and developed various backlash adjusters in which a pressing force is applied by deflection (elastic deformation) of an elastic body in a manner so as to press a worm against a worm wheel. One such backlash-adjuster equipped power steering device has been disclosed in Japanese Unexamined Patent Application Publication No. 2004-345444 (hereinafter is referred to as "JP2004-345444"). In the backlash adjusting technologies, as disclosed in JP2004-345444, owing to a displacement of the worm toward the worm wheel, arising from wear, the amount of deflection of the elastic body decreases, thus causing a decrease of the pressing force. Hence, such a backlash adjuster has the difficulty of producing and/or holding a stable pushing force. A backlash adjuster, capable of producing and/or holding a more stable pushing force, would be desirable.

SUMMARY OF THE INVENTION

Accordingly, it is an object of the invention to provide a power steering device and a backlash adjuster configured to produce and/or hold a more stable pushing force when pushing a worm against a worm wheel.

In order to accomplish the aforementioned and other objects of the present invention, a power steering device comprises a steering mechanism having a steering shaft connected to a steering wheel and adapted to transmit a movement of the steering wheel to steered road wheels, an electric motor configured to apply a steering assist force to the steering mechanism, a speed reducer installed between the steering mechanism and the electric motor, and comprising a worm gear, the worm gear being constructed by a worm shaft whose one axial end is connected to the electric motor and a worm wheel in mesh with the worm shaft for transmitting torque of the electric motor to the steering shaft, a gear housing having a worm-wheel housing section in which the worm wheel is housed and a worm-shaft housing section in which the worm shaft is housed, a slider arranged at the other axial end of the worm shaft housed in the worm-shaft housing section of the gear housing and configured to be movable in a longitudinal direction of the worm shaft, a biasing member configured to bias the slider toward one side of the longitudinal direction of the worm shaft, and a guide member configured to bias the worm shaft in a direction for meshing with the worm wheel by a movement of the worm shaft in the meshing direction that the worm shaft approaches a rotation center of the worm wheel with a movement of the slider toward the one side of the longitudinal direction, and also configured to restrict a movement of the worm shaft in a direction opposite to the meshing direction of the worm shaft.

According to another aspect of the invention, a backlash adjuster for adjusting backlash of a worm gear configured to transmit torque of an electric motor to a steering mechanism adapted to transmit a movement of a steering wheel to steered road wheels, the worm gear being constructed by a worm shaft and a worm wheel, the backlash adjuster comprises a slider installed on a gear housing of the worm gear and configured to be movable in a longitudinal direction of the worm shaft, a biasing member configured to bias the slider toward one side of the longitudinal direction of the worm shaft, and a guide member configured to bias the worm shaft in a direction for meshing with the worm wheel by a movement of the worm shaft in the meshing direction that the worm shaft approaches a rotation center of the worm wheel with a movement of the slider toward the one side of the longitudinal direction, and also configured to restrict a movement of the worm shaft in a direction opposite to the meshing direction of the worm shaft.

The other objects and features of this invention will become understood from the following description with reference to the accompanying drawings.

DESCRIPTION OF THE PREFERRED EMBODIMENTS

First Embodiment

[General System Configuration]

Figure 1:
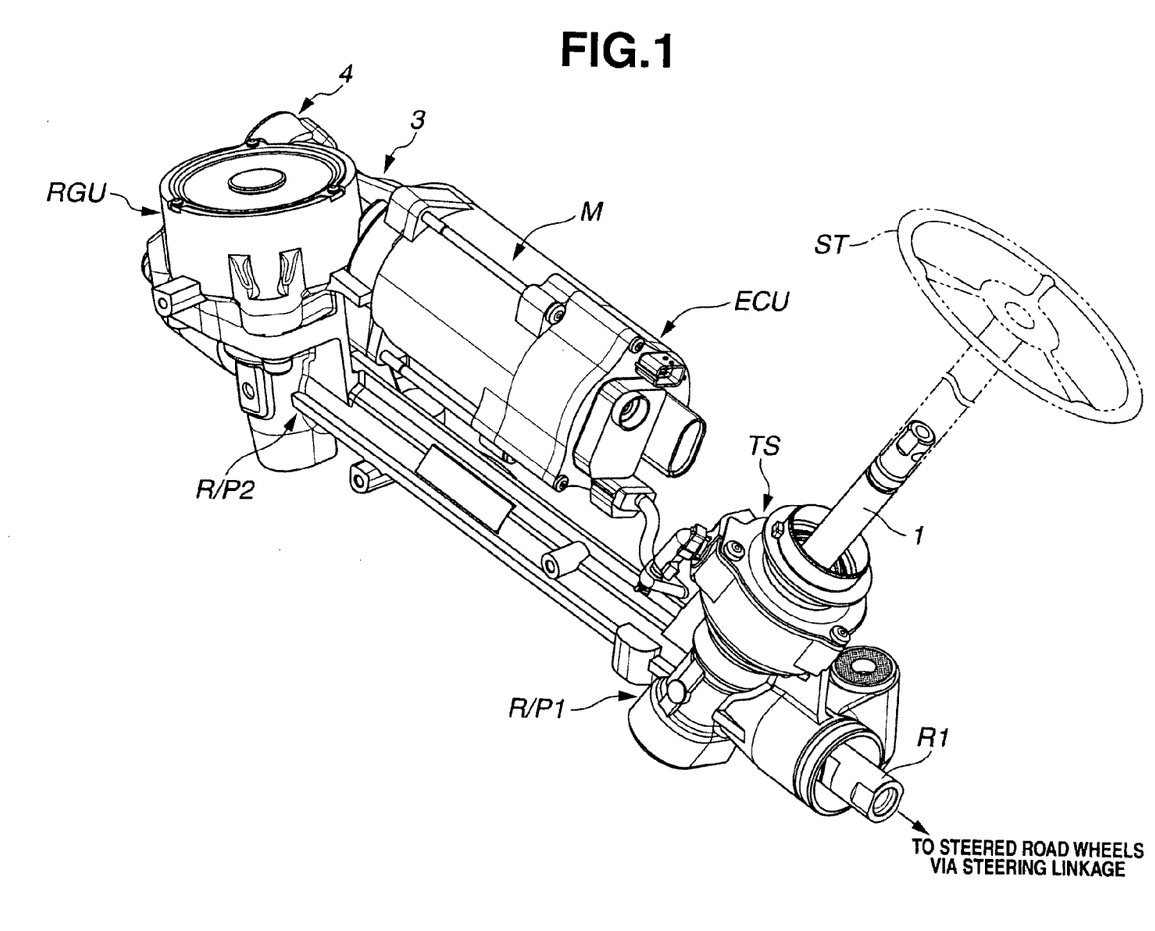
FIG. 1 is a perspective view illustrating the general system configuration of a power steering system of the first embodiment.

Referring now to the drawings, particularly to FIG. 1, there is shown the general system configuration of the power steering system of the first embodiment. The power steering system has a steering shaft 1 connected to a steering wheel ST and a rack-and-pinion steering gear R/P1 serving as a steering mechanism for transmitting a steering-shaft movement (a steering-wheel movement) to steered road wheels. When the steering wheel ST and steering shaft 1 are turned for steering, a rack shaft R1, which meshes with a pinion integrally formed on an axial end of steering shaft 1, moves in the vehicle width direction. This causes the steered road wheels to pivot for steering. A torque sensor TS is provided between the steering shaft 1 and the pinion of rack-and-pinion steering gear R/P1 for detecting driver-applied steering torque. Information about the detected driver-applied steering torque is sent to a power steering controller ECU (described later).

In addition to the rack-and-pinion steering gear R/P1, a power steering unit is also attached to the rack shaft R1 for assisting a movement (a straight-line motion) of the rack shaft R1. The power steering unit has an electric motor M and a reduction gear unit RGU. Rack shaft R1 has rack teeth, in mesh with a pinion P2 of reduction gear unit RGU, as well as rack teeth, in mesh with the pinion on the axial end of steering shaft 1. Steering shaft 1 having the pinion of rack-and-pinion steering gear R/P1 constructs part of the steering mechanism. Power steering controller ECU is mounted on one end of electric motor M and configured to calculate, based on information data signals from the torque sensor TS, a vehicle speed sensor and the like, an assist torque used for assisting the driver-applied steering torque. Power steering controller ECU is also configured to control the operation of electric motor M in a manner so as to apply a steering assist force (simply, an assisting force) to the rack shaft R1 by generating a driving force of electric motor M, corresponding to the calculated assist torque.

Figure 2:
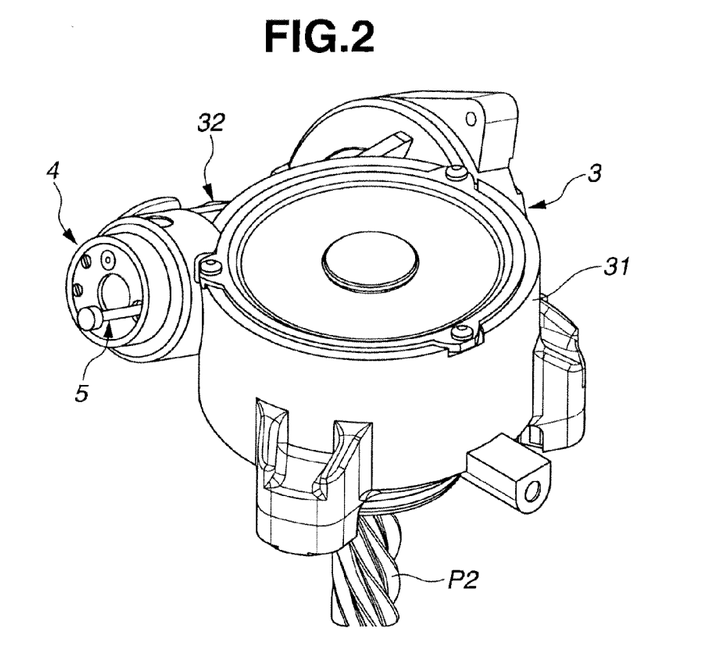
FIG. 2 is a perspective view illustrating a reduction gear unit incorporated in the power steering system of the first embodiment.
Figure 3:
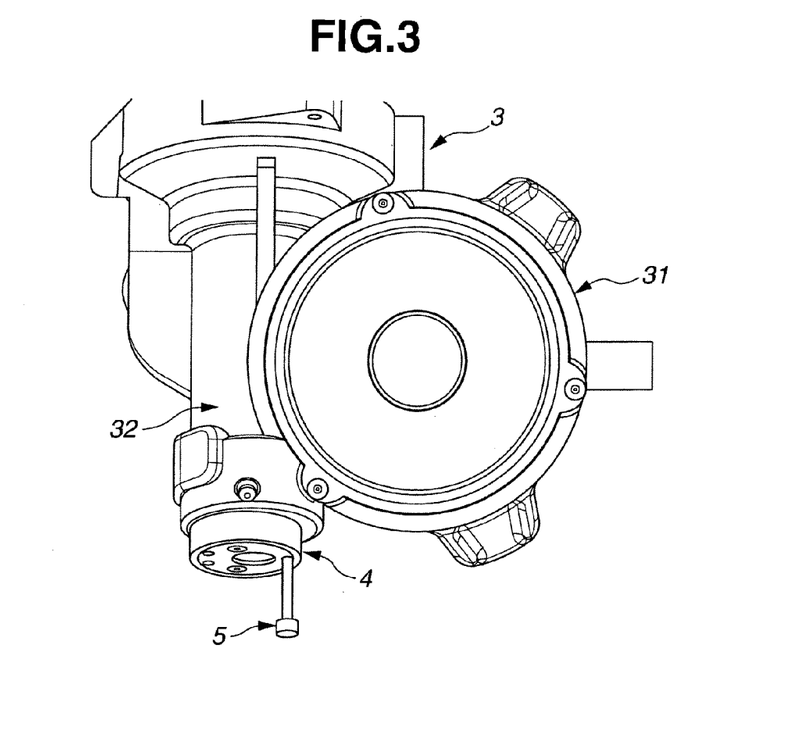
FIG. 3 is a plan view from the pinion-shaft side of the reduction gear unit of the first embodiment.
Figure 4:
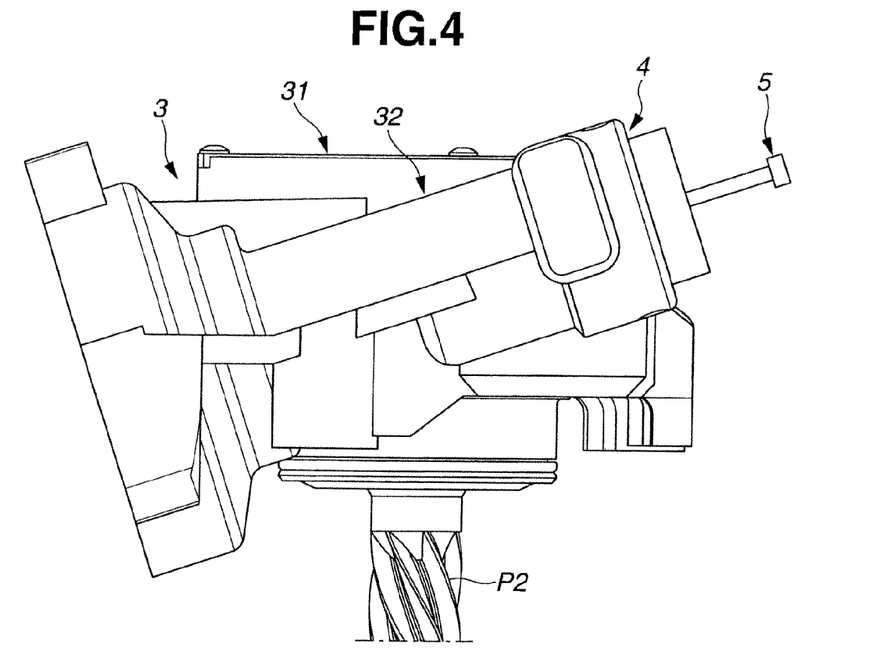
FIG. 4 is a side view in the radial direction of a worm wheel of the reduction gear unit of the first embodiment.
Figure 5:
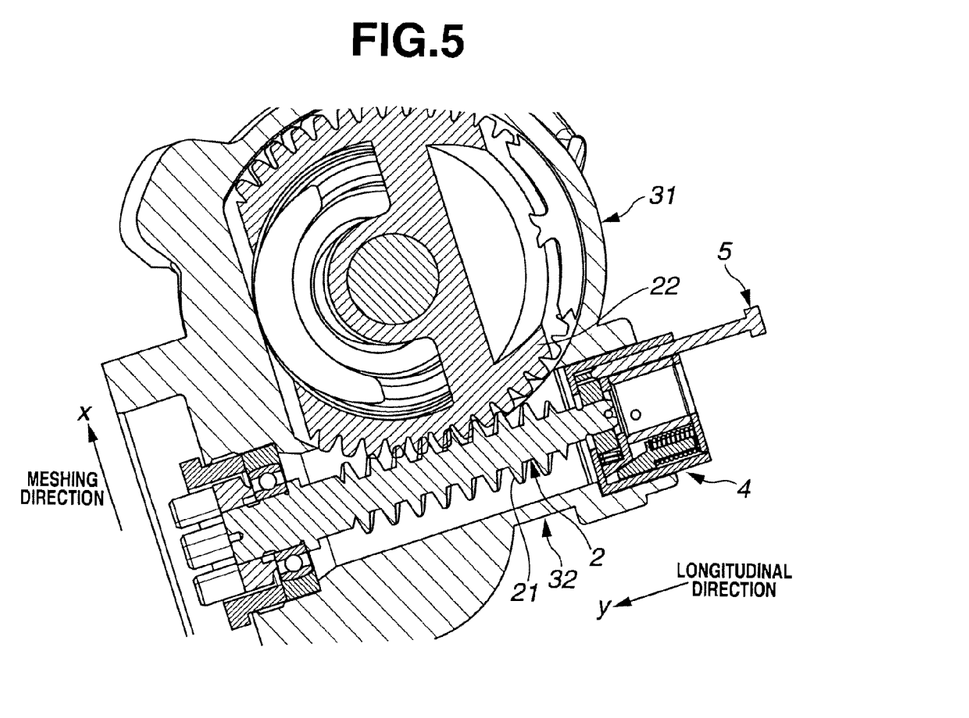
FIG. 5 is a partial cross-sectional view of the reduction gear unit of the first embodiment.

FIG. 2 is the perspective view illustrating the reduction gear unit RGU of the first embodiment. FIG. 3 is the plan view from the pinion-shaft side of reduction gear unit RGU of the first embodiment. FIG. 4 is the side view in the radial direction of a worm wheel of reduction gear unit RGU of the first embodiment. FIG. 5 is the partial cross-section of reduction gear unit RGU of the first embodiment.

Reduction gear unit RGU has a worm gear 2 (a worm speed reducer) constructed by a worm wheel 22 fixedly connected to the pinion P2, and a worm shaft 21. Reduction gear unit RGU has a gear housing 3. Gear housing 3 has a worm-wheel housing section 31 in which worm wheel 22 is housed and a worm-shaft housing section 32 in which worm shaft 21 is housed. Regarding both ends of the worm-shaft housing section 32 of gear housing 3, one axial end of worm shaft 21 is connected to the output shaft of electric motor M at one end of the worm-shaft housing section 32. On the other hand, a backlash adjuster (a backlash adjusting mechanism) 4 is installed or arranged at the opposite end (or on the other side) of worm shaft 21, facing apart from the one axial end (that is, the connected side of worm shaft 21 to the motor M), in the longitudinal direction, for adjusting backlash by pressing or biasing the worm shaft 21 toward the worm wheel 22.

Figure 6:
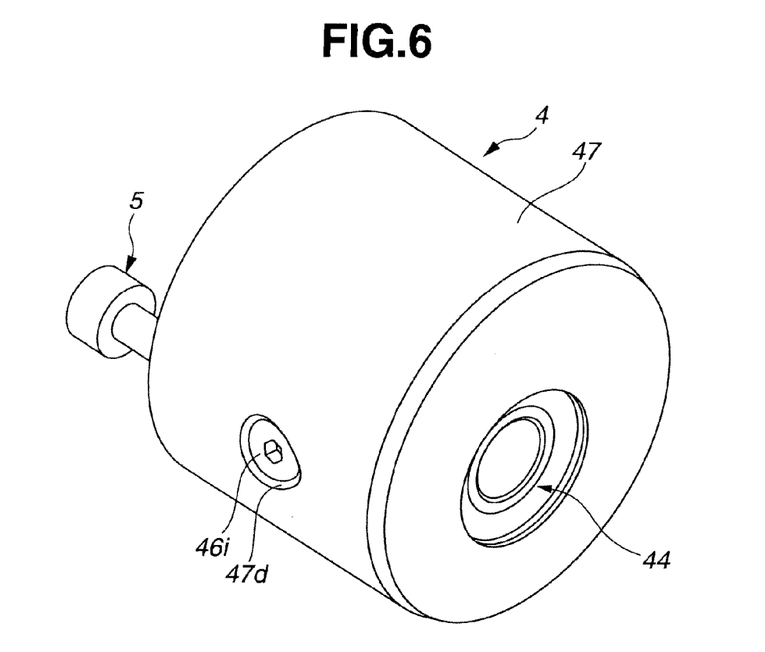
FIG. 6 is a perspective view illustrating a backlash adjuster of the first embodiment.
Figure 7:
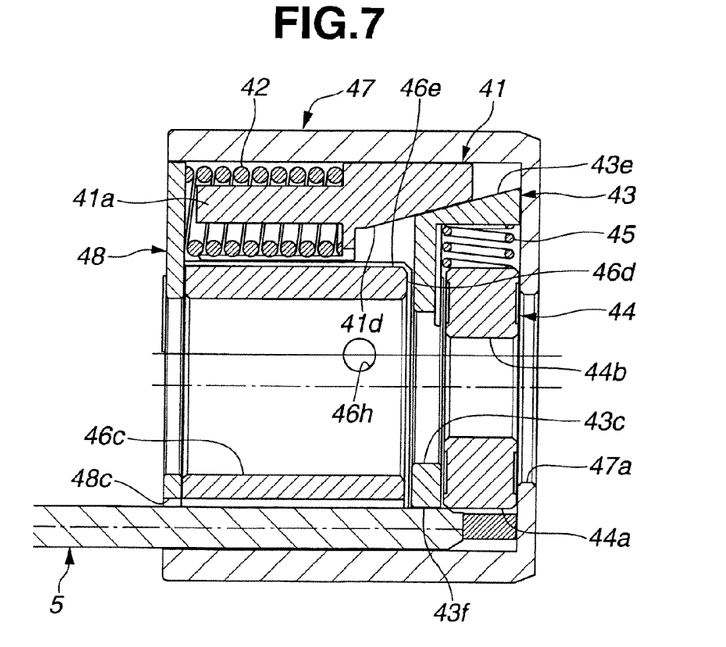
FIG. 7 is a cross-sectional view illustrating the backlash adjuster of the first embodiment.
Figure 8:
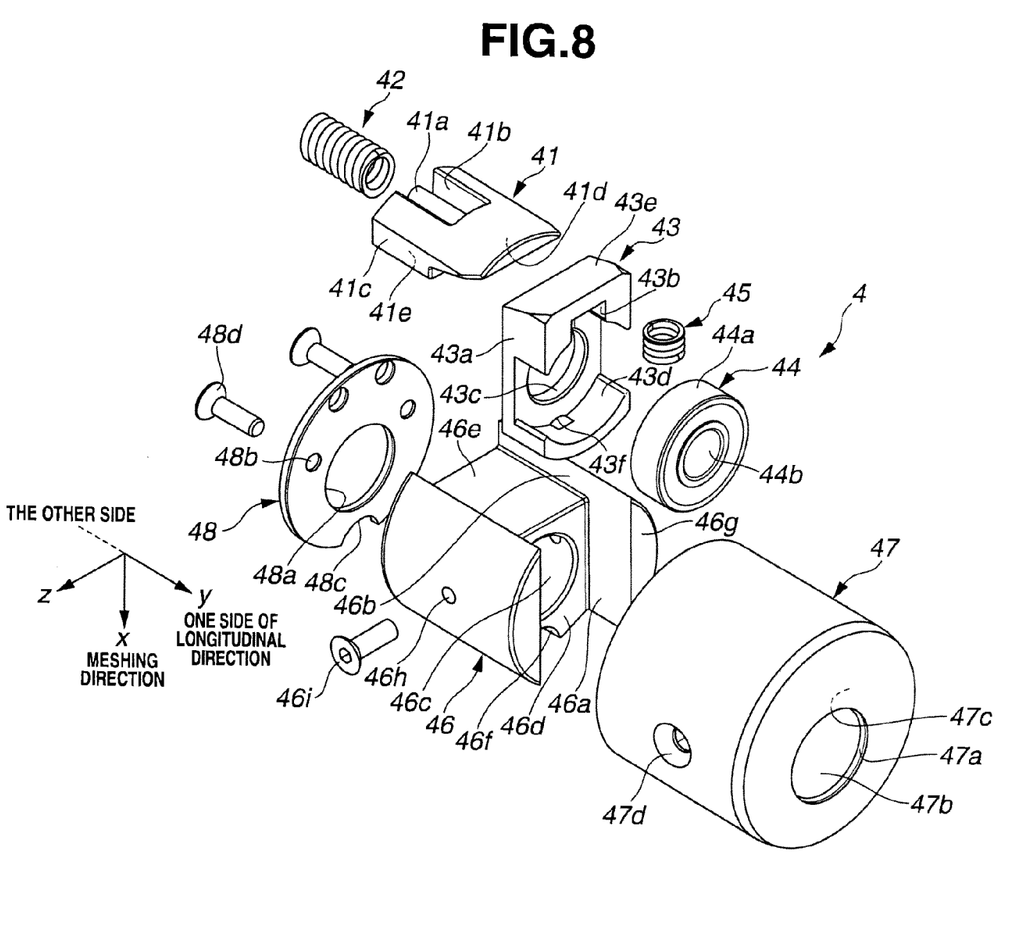
FIG. 8 is a disassembled perspective view illustrating the backlash adjuster of the first embodiment.

FIG. 6 is the perspective view illustrating the backlash adjuster 4 of the first embodiment. FIG. 7 is the cross-section of the backlash adjuster 4 of the first embodiment. FIG. 8 is the disassembled perspective view of the backlash adjuster 4 of the first embodiment. Backlash adjuster 4 is comprised of a slider 41 configured to be movable in the longitudinal direction of worm shaft 21, a biasing member 42 for biasing or forcing the slider 41 toward the one axial end (that is, the connected side of worm shaft 21 to the motor M), in the longitudinal direction of worm shaft 21, and a guide member 43. Guide member 43 is configured to bias the worm shaft 21 in a direction for meshing with the worm wheel 22 by a movement (a relative displacement) of worm shaft 21 in the meshing direction that worm shaft 21 approaches the rotation center of worm wheel 22 with a movement of slider 41 toward the one axial end of worm shaft 21 in the longitudinal direction, and also configured to restrict a movement of worm shaft 21 in the direction opposite to the meshing direction. The one axial end of worm shaft 21 in the longitudinal direction is hereinafter referred to as "the one side of the longitudinal direction", whereas the other axial end (the opposite axial end) of worm shaft 21 in the longitudinal direction is hereinafter referred to as "the other side of the longitudinal direction".

As best seen in FIG. 8, slider 41 has a width across flat part 41c, a tapered abutting surface 41d of the slider side, a sliding-contact surface (simply, a slide surface) 41e, the biasing member 42 (a coil spring in the shown embodiment), and a pin member 41a. When assembling, the slide surface 41e is brought into sliding-contact with a holder member 46 (described later). Biasing member (coil spring) 42 acts to permanently bias the slider 41 toward the one side of the longitudinal direction of worm shaft 21. Pin member 41a is provided to suppress an inclination of the coil spring 42 housed in a spring housing section 41b of slider 41. The width across flat part 41c of slider 41 is configured to permit a movement of slider 41 relative to the holder member 46 (described later) in the longitudinal direction "y" of worm shaft 21, and also configured to restrict a movement of slider 41 in the direction of rotation of worm shaft 21.

As shown in FIG. 8, guide member 43 has a substantially cylindrical-hollow bearing housing section 43d and a spring housing section 43b. Bearing housing section 43d is configured to hold the outer-ring outer periphery 44a of a rolling bearing 44, which rotatably support the one axial end of worm shaft 21. Spring housing section 43b is configured to house a coil spring 45. Coil spring 45, installed in the spring housing section 43b, acts to permanently bias the bearing 44, installed in the bearing housing section 43d, in the meshing direction "x". Also, guide member 43 has a width across flat part 43a, a tapered abutting surface 43e of the guide member side, a through hole 43c, and an assembling-shaft insertion section 43f.

The width across flat part 43a of guide member 43 is configured to permit a movement of guide member 43 relative to the holder member 46 (described later) in the meshing direction "x", and also configured to restrict a movement of guide member 43 in the direction of rotation of worm shaft 21. By means of the sliding pair of the slider-side tapered abutting surface 41d and the guide-member-side tapered abutting surface 43e, in abutting-engagement with each other, a movement of slider 41 in the longitudinal direction "y" of worm shaft 21 can be converted into a movement of guide member 43 in the meshing direction "x". Conversely, a movement of guide member 43 in the meshing direction "x" cannot be converted into a movement of slider 41 in the longitudinal direction "y" of worm shaft 21. This is because the inclination angle of these two tapered surfaces (that is, both of abutting surface 41d and abutting surface 43e) is set to a given angle that permits a movement of guide member 43 in the meshing direction "x" in the presence of an input from the slider 41 to the guide member 43, but restricts a movement of slider 41 toward the other side of the longitudinal direction of worm shaft 21 in the presence of an input from the guide member 43 to the slider 41. As discussed above, with a motion-transmission irreversibility between an input direction of a force and a direction of movement, a relative-position relation between guide member 43 and worm shaft 21 can be kept constant, thereby keeping an appropriate meshing state of worm gear 2 (worm wheel 22 and worm shaft 21 in mesh with each other).

Holder member 46 has a slider sliding surface 46e and a guide wall part 46b. Slider sliding surface 46e is formed on the side (i.e., the upside, viewing FIGS. 7-8) of holder member 46 opposite to the meshing direction "x". Guide wall part 46b has two parallel upright flat surfaces formed on both sides of slider sliding surface 46e, for guiding the width across flat part 41c of slider 41. The width across flat part 41c of slider 41 and the guide wall part 46b of holder member 46 construct a guiding mechanism. Also, the slider sliding surface 46e of holder member 46 is configured to restrict a movement of the slider 41 in the meshing direction "x", while guiding the slide surface 41e of slider 41. That is, the slide surface 41e of slider 41 and the slider sliding surface 46e of holder member 46 construct a guiding/restricting mechanism. Furthermore, holder member 46 has a guide-member sliding surface 46d and a guide wall part 46a. Guide-member sliding surface 46d is formed on the one side (i.e., the right-hand side face, viewing FIGS. 7-8) of the longitudinal direction of worm shaft 21. Guide wall part 46a has two parallel upright flat surfaces formed on both sides of guide-member sliding surface 46d, for guiding the width across flat part 43a of guide member 43. The width across flat part 43a of guide member 43 and the guide wall part 46a of holder member 46 construct a sliding mechanism.

Furthermore, holder member 46 has a through hole 46c bored in the longitudinal direction "y" of worm shaft 21 and an assembling-shaft insertion groove 46f cut and formed on the side (i.e., the underside, viewing FIGS. 7-8) of holder member 46 identical to the meshing direction "x", in a manner so as to extend in the longitudinal direction of worm shaft 21. Additionally, a fixing-bolt mounting screw-threaded hole 46h is formed in the outer peripheral surface of holder member 46. A fixing bolt 46i, which is used for fixing the holder member 46 to a substantially cylindrical-hollow case 47 (described later), is screwed into the mounting hole 46h of holder member 46.

Slider 41, guide member 43, and holder member 46, temporarily assembled to each other, are installed in a cylindrical-hollow internal space of case 47. Case 47 is formed with a case bottom face 47c. A worm-shaft-end insertion through hole 47a is formed in the case bottom face 47c. When assembling, the other axial end of worm shaft 21 is inserted through the through hole 47a of bottom face 47c into the case 47. Holder member 46 can be positioned in place by abutment of the bottom face 47c of case 47 with an end face 46g of holder member 46. Additionally, a bolt hole 47d is formed in the outer peripheral surface of case 47. The fixing bolt 46i, which is used for fixing the holder member 46 to the case 47, is inserted into the bolt hole 47d of case 47.

After slider 41, guide member 43, and holder member 47 have been installed in the case 47, the opening end of case 47, formed to be opposed to the bottom face 47c in the longitudinal direction "y", is closed by means of a plate member 48. In this manner, the backlash adjuster can be temporarily assembled and produced. Plate member 48 has at least one through hole 48b (two through holes in the shown embodiment), a circular opening 48a whose inside diameter is dimensioned to be identical to the through hole 46c of holder member 46, and a substantially semi-circular cutout 48c configured such that an assembling shaft 5 (described later) is inserted through the cutout 48c of plate member 48. A fixing bolt 48d, which is used for fixing the plate member 48 to the holder member 46, is inserted into the through hole 48b of plate member 48. With the plate member 48 fixedly connected to the holder member 46 by fastening them together with the fixing bolt 48d, the plate member 48 also serves as a spring seat for ensuring a spring force of the coil spring 42 that permanently biases the slider 41 toward the one side of the longitudinal direction of worm shaft 21.

(Operation of Backlash Adjuster)

The other axial end of worm shaft 21 is inserted through the through hole 47a of case 47 into the inner-ring inner periphery 44b of bearing 44 of backlash adjuster 4 from the one side of the longitudinal direction of worm shaft 21 to the other side, and whereby worm shaft 21 is biased or forced in the meshing direction "x" by a spring force (a spring bias or an elastic force) of coil spring 45. The position of guide member 43 in the meshing direction "x" is determined by the position of slider 41 in the longitudinal direction "y". In an initial state before wear occurs or starts to progress, slider 41 is positioned toward the other side of the longitudinal direction, that is, nearer the right-hand side (in other words, nearer the inside face of plate member 48). Hence, the tip (the nose) of the slider-side tapered abutting surface 41d abuts with a portion of the other side of the longitudinal direction of the guide-member-side tapered abutting surface 43e, and thus guide member 43 is positioned relatively away from the worm wheel 22 in the meshing direction.

After this, when wear of the meshing part between worm shaft 21 and worm wheel 22 progresses, slider 41 is moved toward the one side of the longitudinal direction of worm shaft 21 by a spring force (a spring bias or an elastic force) of coil spring 42, thereby enabling the guide member 43 to be automatically pushed or displaced in the meshing direction "x", such that backlash of worm gear 2 can be automatically adjusted. At this time, that is, during self-adjustment (automatic adjustment) of backlash, a relative-position relation between the bearing 44 (in other words, the other axial end of worm shaft 21) and guide member 43 is not changed, but kept constant. Therefore, the spring bias (the spring force), applied to the worm shaft 21, is stably held or maintained by the elastic force (the spring force) of coil spring 45. By the way, as previously discussed, by virtue of the tapered surfaces (that is, both of abutting surface 41d and abutting surface 43e) having the given inclination angle, slider 41 cannot be moved or displaced toward the other side of the longitudinal direction by an input from the guide member 43 to the slider 41.

Hereunder explained is the operation of assembling shaft 5 in an assembled state of backlash adjuster 4 before backlash adjuster 4 is installed onto the reduction gear unit RGU. FIGS. 2-7 show the backlash adjuster 4 in a specified state where assembling shaft 5 itself is installed or inserted into the backlash adjuster 4. As discussed previously, backlash adjuster 4 of the first embodiment is configured such that backlash can be automatically adjusted by pushing or moving the guide member 43 in the meshing direction "x" by an input from the slider 41. At this time, even if there is an input directed from the guide member 43 to the slider 41, the slider 41 cannot be moved or displaced toward the other side of the longitudinal direction of worm shaft 21 by virtue of the previously-noted irreversibility. Assume that the backlash adjuster 4 has been assembled without the assembling shaft 5. In such a case, guide member 43 is displaced in the meshing direction "X" by means of the spring-loaded slider 41. Thereafter, when backlash adjuster 4 is installed or fitted onto the reduction gear unit RGU (in particular, the other axial end of worm shaft 21), the guide member 43 cannot be displaced or pushed in the direction opposite to the meshing direction "x" by virtue of the previously-noted irreversibility.

For the reasons discussed above, when assembling the backlash adjuster 4, the assembling shaft 5 is used, as follows.

When assembling, first, bearing 44 and coil spring 45 are both installed in the guide member 43, and then the guide member 43 together with the holder member 46 is installed into the interior space of case 47. At this time, assembling shaft 5 is inserted into the assembling-shaft insertion groove 46f of holder member 46, and then the tip of assembling shaft 5 is inserted or fitted into the assembling-shaft insertion section 43f of guide member 43. With the assembling shaft 5 installed in place, the position of guide member 43 in the meshing direction "x" is restricted to a given position away from the worm wheel 22. Under these conditions, coil spring 42 is installed in the spring housing section 41b of slider 41, while fitting onto the pin member 41a, and then the slider 41 is inserted onto the upside (slider sliding surface 46e) of holder member 46. Thereafter, the opening end of case 47, formed to be opposed to the bottom face 47c, is closed or covered by the plate member 48 from the other side of the longitudinal direction. As discussed above, backlash adjuster 4 can be properly assembled by the use of the assembling shaft 5. When the assembled backlash adjuster 4 with the assembling shaft 5 is installed onto the reduction gear unit RGU, the other axial end of worm shaft 21 of reduction gear unit RGU is smoothly inserted or fitted into the inner-ring inner periphery 44b of bearing 44 of backlash adjuster 4. Thereafter, by removing the assembling shaft 5 from the backlash adjuster 4, installation of the backlash adjuster 4 on the reduction gear unit RGU is completed.

The effects, obtained by the power steering device to which the backlash adjuster 4 of the first embodiment is applied, are hereinafter enumerated.

(1-1-(1))

According to one aspect of the first embodiment, a power steering device includes a rack-and-pinion steering gear R/P1 (a steering mechanism) having a steering shaft 1 connected to a steering wheel ST and adapted to transmit a movement of the steering wheel ST to steered road wheels, an electric motor M configured to apply a steering assist force to the rack-and-pinion steering gear R/P1, a speed reducer installed between the rack-and-pinion steering gear R/P1 and the electric motor M, and comprising a worm gear 2, the worm gear being constructed by a worm shaft 21 whose one axial end is connected to the electric motor M and a worm wheel 22 in mesh with the worm shaft 21 for transmitting torque of the electric motor M to the steering shaft 1, a gear housing 3 having a worm-wheel housing section 31 in which the worm wheel 22 is housed and a worm-shaft housing section 32 in which the worm shaft 21 is housed, a slider 41 arranged at the other axial end of the worm shaft 21 housed in the worm-shaft housing section 32 of the gear housing 3 and configured to be movable in a longitudinal direction of the worm shaft 21, a biasing member 42 configured to bias the slider 41 toward one side of the longitudinal direction of the worm shaft 21, and a guide member 43 configured to bias the worm shaft 21 in a direction for meshing with the worm wheel 22 by a movement of the worm shaft 21 in the meshing direction that the worm shaft 21 approaches a rotation center of the worm wheel 22 with a movement of the slider 41 toward the one side of the longitudinal direction, and also configured to restrict a movement of the worm shaft 21 in a direction opposite to the meshing direction of the worm shaft 21.

Hence, even in the presence of an increase in backlash between worm wheel 22 and worm shaft 21, caused by wear of the worm wheel 22, worm shaft 21 can be displaced in the direction for meshing with the worm wheel 22 with the guide member 43 automatically displaced through the slider 41 by the biasing member 42, and whereby it is possible to properly reduce and automatically adjust the backlash of worm gear 2. Additionally, by virtue of the irreversibility, a movement of the guide member 43 in the direction for increasing of the backlash is restricted, and thus it is possible to suppress the amount of backlash, properly reduced and optimized once by the guide member 43, from increasing again by an input to the worm shaft 21.

(1-2-(2))

The power steering device as recited in item (1-1-(1)), further includes a rolling bearing 44 configured to rotatably support the other axial end of the worm shaft 21. In the power steering device, the guide member 43 is configured to bias the worm shaft 21 in the meshing direction via the rolling bearing 44.

By means of the rolling bearing 44 interleaved between the guide member 43 and the worm shaft 21, rotary motion of worm shaft 21 is hardly affected by the bias of the guide member 43, thus realizing smooth steering assist torque application to the rack shaft R1 of rack-and-pinion steering gear R/P1.

(1-3-(3))

The power steering device as recited in item (1-2-(2)), further includes a sliding mechanism (width across flat part 43a and guide wall part 46a) arranged radially outside of the rolling bearing 44 for permitting a movement of the rolling bearing 44 in the meshing direction, and for restricting a movement of the rolling bearing 44 in a direction of a rotation axis of the worm wheel 22.

Hence, the direction for biasing of the worm shaft 21 can be restricted or limited to the meshing direction, thereby keeping an appropriate meshing state of the worm gear 2 (worm wheel 22 and worm shaft 21 in mesh with each other).

(1-4-(4))

The power steering device as recited in item (1-3-(3)), further includes a case 47 configured to house the slider 41, the guide member 43, and the sliding mechanism (width across flat part 43a and guide wall part 46a).

Three major members (slider 41, guide member 43, and holder member 46) are configured to be housed in the same case 47, and thus the backlash adjuster 4 can be installed or mounted onto the reduction gear unit RGU in an assembled state where these three members are compactly housed in the case 47, thereby facilitating an assembling/mounting work.

(1-5-(5))

The power steering device as recited in item (1-2-(2)), further includes a guiding mechanism (width across flat part 41c and guide wall part 46b) configured to restrict a movement of the slider 41 in a direction of rotation of the worm shaft 21.

Restricting a movement of the slider 41 in a circumferential direction of the worm shaft 21 by means of the guiding mechanism (width across flat part 41c and guide wall part 46b) contributes to improvement of the accuracy of management of the amount of movement of the guide member 43, which movement may be caused by the movement of the slider 41 in the circumferential direction.

(1-6-(6))

The power steering device as recited in item (1-2-(2)), further includes a guiding mechanism (slide surface 41e and slider sliding surface 46e) configured to restrict a movement of the slider 41 in the meshing direction.

Slider 41 is stably supported on the holder member 46 in the backlash adjuster 4 by the guiding/restricting mechanism (slide surface 41e and slider sliding surface 46e), and thus it is possible to suppress undesirable fluctuations in meshing-contact pressure of the worm shaft 21 with the worm wheel 22.

(1-7-(7))

The power steering device as recited in item (1-2-(2)), further includes a case 47 configured to restrict a movement of the slider 41 in the direction opposite to the meshing direction.

Slider 41 is stably supported in the backlash adjuster 4 by the case 47, and thus it is possible to suppress undesirable fluctuations in meshing-contact pressure of the worm shaft 21 with the worm wheel 22.

(1-8-(11))

In the power steering device as recited in item (1-2-(2)), the biasing member is constructed by a coil spring 42. Also provided is a pin member 41a configured to restrict a movement of the slider 41 in a direction of rotation of the worm shaft 21 and suppress an inclination of the coil spring 42.

Suppressing an inclination of the coil spring 42 contributes to stabilization of the spring bias (the spring force) of coil spring 42. Also, restricting a movement of the slider 41 in a circumferential direction of the worm shaft 21 by means of the pin member 41a contributes to improvement of the accuracy of management of the amount of movement of the guide member 43, which movement may be caused by the movement of the slider 41 in the circumferential direction.

(1-9-(12))

In the power steering device as recited in item (1-1-(1)), the guide member 43 is configured such that a movement of the guide member in the direction opposite to the meshing direction is restricted even in an abutting state of the steering wheel ST turned to a maximum steering-wheel angular displacement.

Hence, even in an abutting state of steering wheel ST turned to a maximum steering-wheel angular displacement, it is possible to ensure an appropriate meshing state of worm gear 2.

(1-10-(13))

In the power steering device as recited in item (1-1-(1)), the slider 41 and the guide member 43 have respective abutting surfaces brought into abutting-engagement with each other, and the abutting surfaces are configured as tapered abutting surfaces 41d and 43e inclined with respect to a direction of movement of the slider 41.

The inclination angle of the tapered abutting surfaces is set to a given angle that permits a movement of the guide member 43 in the meshing direction in the presence of an input from the slider 41 to the guide member 43, but restricts a movement of the slider 41 toward the other side of the longitudinal direction of the worm shaft 21 in the presence of an input from the guide member 43 to the slider 41.

Constructing the abutting surfaces of slider 41 and guide member 43 by tapered abutting surfaces 41d and 43e contributes to smooth relative movement of slider 41 and guide member 43. With an irreversibility of motion transmission, created by the inclination angle set to the given angle, it is possible to keep an appropriate meshing state of worm gear 2.

(1-11-(15))

According to another aspect of the first embodiment, a backlash adjuster 4 for adjusting backlash of a worm gear 2 configured to transmit torque of an electric motor M to a steering mechanism adapted to transmit a movement of a steering wheel ST to steered road wheels, the worm gear 2 being constructed by a worm shaft 21 and a worm wheel 22, the backlash adjuster includes a slider 41 installed on a gear housing 3 of the worm gear 2 and configured to be movable in a longitudinal direction of the worm shaft 21, a biasing member 42 configured to bias the slider 41 toward one side of the longitudinal direction of the worm shaft 21, and a guide member 43 configured to bias the worm shaft 21 in a direction for meshing with the worm wheel 22 by a movement of the worm shaft 21 in the meshing direction that the worm shaft 21 approaches a rotation center of the worm wheel 22 with a movement of the slider 41 toward the one side of the longitudinal direction, and also configured to restrict a movement of the worm shaft 21 in a direction opposite to the meshing direction of the worm shaft 21.

Hence, even in the presence of an increase in backlash between worm wheel 22 and worm shaft 21, caused by wear of the worm wheel 22, worm shaft 21 can be displaced in the direction for meshing with the worm wheel 22 with the guide member 43 automatically displaced through the slider 41 by the biasing member 42, and whereby it is possible to properly reduce and automatically adjust the backlash of worm gear 2. Additionally, by virtue of the irreversibility, a movement of the guide member 43 in the direction for increasing of the backlash is restricted, and thus it is possible to suppress the amount of backlash, properly reduced and optimized once by the guide member 43, from increasing again by an input to the worm shaft 21.

(1-12-(16))

The backlash adjuster as recited in item (1-11-(15)), further includes a rolling bearing 44 configured to rotatably support the other axial end of the worm shaft 21. In the power steering device, the guide member 43 is configured to bias the worm shaft 21 in the meshing direction via the rolling bearing 44.

By means of the rolling bearing 44 interleaved between the guide member 43 and the worm shaft 21, rotary motion of worm shaft 21 is hardly affected by the bias of the guide member 43.

(1-13-(17))

The backlash adjuster as recited in item (1-12-(16)), further includes a sliding mechanism (width across flat part 43a and guide wall part 46a) arranged radially outside of the rolling bearing 44 for permitting a movement of the rolling bearing 44 in the meshing direction, and for restricting a movement of the rolling bearing 44 in a direction of a rotation axis of the worm wheel 22.

Hence, the direction for biasing of the worm shaft 21 can be restricted or limited to the meshing direction, thereby keeping an appropriate meshing state of the worm gear 2 (worm wheel 22 and worm shaft 21 in mesh with each other).

(1-14-(18))

The backlash adjuster as recited in item (1-13-(17)), further includes a case 47 configured to house the slider 41, the guide member 43, and the sliding mechanism (width across flat part 43a and guide wall part 46a).

Three major members (slider 41, guide member 43, and holder member 46) are configured to be housed in the same case 47, and thus the backlash adjuster 4 can be installed or mounted onto the reduction gear unit RGU in an assembled state where these three members are compactly housed in the case 47, thereby facilitating an assembling/mounting work.

(1-15-(20))

In the backlash adjuster as recited in item (1-11-(15)), the guide member 43 is configured such that a movement of the guide member in the direction opposite to the meshing direction is restricted even in an abutting state of the steering wheel ST turned to a maximum steering-wheel angular displacement.

Hence, even in an abutting state of steering wheel ST turned to a maximum steering-wheel angular displacement, it is possible to ensure an appropriate meshing state of worm gear 2.

Second Embodiment

The backlash adjuster of the second embodiment is hereinafter described in detail. The fundamental construction of the backlash adjuster of the second embodiment is similar to that of the first embodiment. The same reference signs used to designate components in the backlash adjuster shown in FIG. 8 will be applied to the corresponding reference signs used in the second embodiment shown in FIG. 9, for the purpose of comparison of the two different embodiments. Thus, only the construction of the second embodiment different from the first embodiment is hereunder explained.

Figure 9:
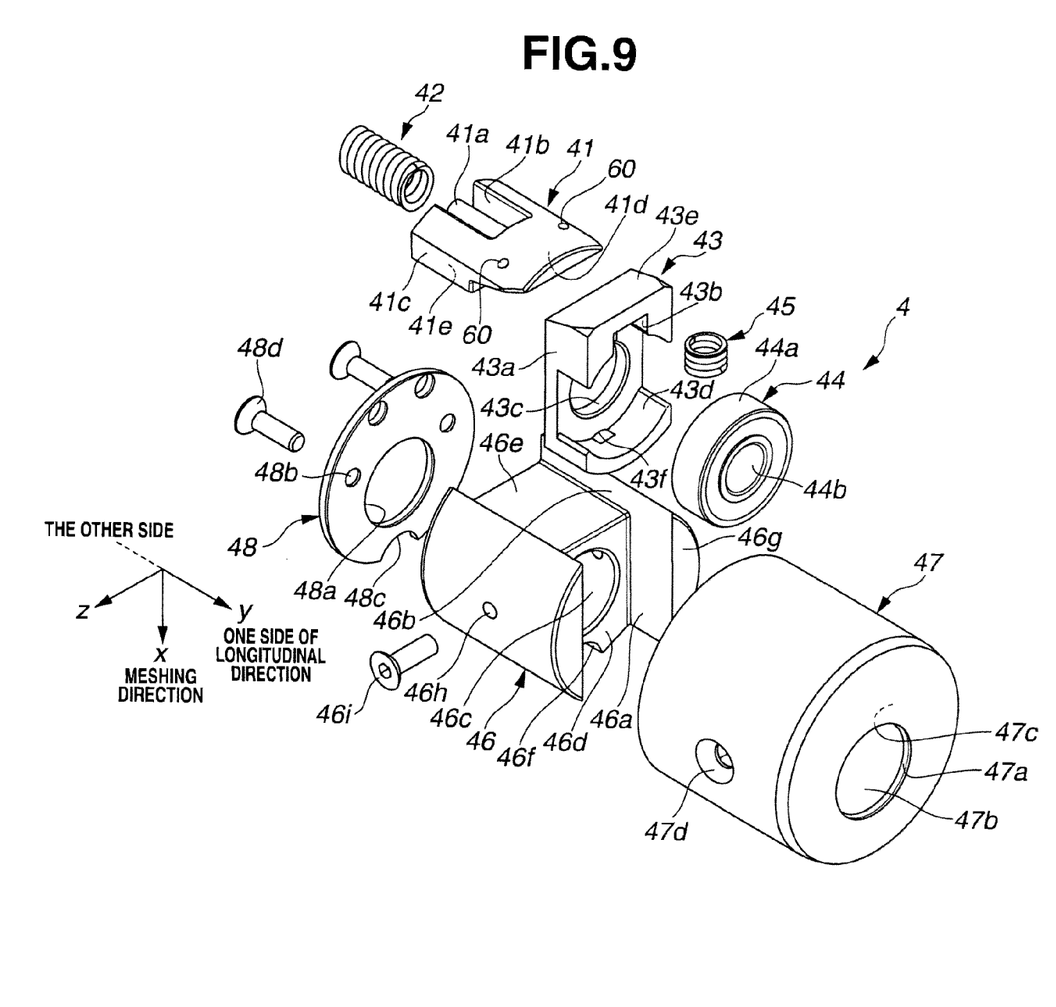
FIG. 9 is a disassembled perspective view illustrating the backlash adjuster of the second embodiment.

Referring now to FIG. 9, there is shown the disassembled perspective view illustrating the backlash adjuster of the second embodiment.

The outer peripheral surface (i.e., the upside, viewing FIG. 8) of slider 41 of the first embodiment is configured as a smooth surface, brought into wall-contact with the inner peripheral surface 47b of the cylindrical-hollow case 47, when assembling. In contrast, the backlash adjuster of the second embodiment of FIG. 9 is different from that of the first embodiment of FIG. 8, in that the backlash adjuster of the second embodiment has at least one protruding portion 60 integrally formed on the upside of slider 41 and having a substantially semi-spherical shape. When assembling, the protruding portion 60 is brought into abutment with the inner peripheral surface 47b of the cylindrical-hollow case 47. By virtue of abutment of the protruding portion 60 with the inner peripheral surface 47b of case 47, it is possible to reduce a sliding-contact resistance to relative motion between the outer peripheral surface of slider 41 and the inner peripheral surface of case 47. In the second embodiment, slider 41 and its protruding portion 60 are integrally formed from a synthetic resin material. This contributes to easy forming or shaping. Additionally, repetition of sliding motion of the protruding portion 60 of slider 41 (formed from a synthetic resin material) relative to the inner peripheral surface of case 47 (formed from a metallic material) produces an appropriate wear of the protruding portion 60, and thus a sliding clearance between slider 41 (exactly, the protruding portion 60) and case 47 (exactly, the inner peripheral surface of case 47) can be optimized. In forming or arranging the protruded portion 60 on the upside of slider 41, in the shown embodiment, a pair of protruding portions 60, 60 are arranged only on the one side of the longitudinal direction of slider 41 (that is, the right-hand side of the upside of slider 41, viewing FIG. 9) and arranged mirror-symmetrical with respect to the longitudinally-extending neutral axis of slider 41, for the reason discussed below. Suppose that only a reduction in sliding-contact resistance has to be taken into account. In such a case, it is effective to equally arrange a plurality of protruding portions 60 around the entire longitudinal length of the outer peripheral surface (the upside) of slider 41. However, it is very important that an abutment area between slider 41 and guide member 43 on the one side of the longitudinal direction of slider 41 is stably maintained. In other words, assuming that the protruding portion 60 is arranged within a specified area of the longitudinal direction other than the above-noted abutment area between slider 41 and guide member 43 on the one side of the longitudinal direction of slider 41, abutment (sliding-contact) between slider 41 and guide member 43 occurs only within the specified area other than the abutment area between slider 41 and guide member 43 on the one side of the longitudinal direction of slider 41. In this case, an appropriate sliding-contact between slider 41 and guide member 43 may be disturbed, for example, there is a possibility that the slider-side tapered abutting surface 41d is brought out of abutment with the guide-member-side tapered abutting surface 43e, thereby resulting in an unstable sliding-contact state of slider 41 and guide member 43.

The effects, obtained by the second embodiment, are hereinafter enumerated.

(2-1-(8))

According to one aspect of the second embodiment, a power steering device includes a rack-and-pinion steering gear R/P1 (a steering mechanism) having a steering shaft 1 connected to a steering wheel ST and adapted to transmit a movement of the steering wheel ST to steered road wheels, an electric motor M configured to apply a steering assist force to the rack-and-pinion steering gear R/P1, a speed reducer installed between the rack-and-pinion steering gear R/P1 and the electric motor M, and comprising a worm gear 2, the worm gear being constructed by a worm shaft 21 whose one axial end is connected to the electric motor M and a worm wheel 22 in mesh with the worm shaft 21 for transmitting torque of the electric motor M to the steering shaft 1, a gear housing 3 having a worm-wheel housing section 31 in which the worm wheel 22 is housed and a worm-shaft housing section 32 in which the worm shaft 21 is housed, a slider 41 arranged at the other axial end of the worm shaft 21 housed in the worm-shaft housing section 32 of the gear housing 3 and configured to be movable in a longitudinal direction of the worm shaft 21, a biasing member 42 configured to bias the slider 41 toward one side of the longitudinal direction of the worm shaft 21, and a guide member 43 configured to bias the worm shaft 21 in a direction for meshing with the worm wheel 22 by a movement of the worm shaft 21 in the meshing direction that the worm shaft 21 approaches a rotation center of the worm wheel 22 with a movement of the slider 41 toward the one side of the longitudinal direction, and also configured to restrict a movement of the worm shaft 21 in a direction opposite to the meshing direction of the worm shaft 21. The power steering device further includes a rolling bearing 44 configured to rotatably support the other axial end of the worm shaft 21, and the guide member 43 is configured to bias the worm shaft 21 in the meshing direction via the rolling bearing 44. The power steering device still further includes a case 47 configured to restrict a movement of the slider 41 in the direction opposite to the meshing direction. The slider 41 has at least one protruding portion 60 formed on an outer peripheral surface opposing to an inner peripheral surface 47b of the case 47 and arranged radially outwards with respect to a rotation axis of the worm shaft 21 used as a reference.

By bringing the protruding portion 60 into abutment with the inner peripheral surface of case 47, the entire outer peripheral wall surface of slider 41 cannot be brought into sliding-contact (wall-contact) with the inner peripheral surface of case 47. Hence, it is possible to reduce a sliding-contact resistance to relative motion between slider 41 and case 47.

(2-2-(9))

In the power steering device as recited in item (2-2-(8)), the slider 41 and the protruding portion 60 are integrally formed from a synthetic resin material.

By repeatedly using the backlash-adjusted equipped power steering device, an appropriate wear of the protruding portion 60 occurs, and thus a sliding clearance between the protruding portion 60 of slider 41 and the inner peripheral surface of case 47 can be optimized.

(2-3-(10))

In the power steering device as recited in item (2-2-(6)), the protruding portion 60 is arranged on the one side of the longitudinal direction of the slider 41.

In managing a movement of guide member 43 (in the meshing direction "X") with respect to the amount of sliding motion of slider 41 (in the longitudinal direction "y") relative to the case 47 (or the holder member 46), it is very important that an abutment area between slider 41 and guide member 43 on the one side of the longitudinal direction of slider 41 is stably maintained. Hence, the protruding portion 60 is arranged on the one side of the longitudinal direction of slider 41, and therefore it is possible to enhance the degree of wall-contact between slider 41 (exactly, the slider-side tapered abutting surface 41d) and guide member 43 (exactly, the guide-member-side tapered abutting surface 43e) on the one side of the longitudinal direction. This facilitates the management of a movement of guide member 43 with respect to the amount of sliding motion of slider 41.

(2-4-(19))

According to another aspect of the second embodiment, a backlash adjuster 4 for adjusting backlash of a worm gear 2 configured to transmit torque of an electric motor M to a steering mechanism adapted to transmit a movement of a steering wheel ST to steered road wheels, the worm gear 2 being constructed by a worm shaft 21 and a worm wheel 22, the backlash adjuster includes a slider 41 installed on a gear housing 3 of the worm gear 2 and configured to be movable in a longitudinal direction of the worm shaft 21, biasing member 42 configured to bias the slider 41 toward one side of the longitudinal direction of the worm shaft 21, and a guide member 43 configured to bias the worm shaft 21 in a direction for meshing with the worm wheel 22 by a movement of the worm shaft 21 in the meshing direction that the worm shaft 21 approaches a rotation center of the worm wheel 22 with a movement of the slider 41 toward the one side of the longitudinal direction, and also configured to restrict a movement of the worm shaft 21 in a direction opposite to the meshing direction of the worm shaft 21. The backlash adjuster further includes a rolling bearing 44 configured to rotatably support the other axial end of the worm shaft 21, and the guide member 43 is configured to bias the worm shaft 21 in the meshing direction via the rolling bearing 44. The backlash adjuster still further includes a case 47 configured to restrict a movement of the slider 41 in the direction opposite to the meshing direction. The slider 41 has at least one protruding portion 60 formed on an outer peripheral surface opposing to an inner peripheral surface 47b of the case 47 and arranged radially outwards with respect to a rotation axis of the worm shaft 21 used as a reference.

By bringing the protruding portion 60 into abutment with the inner peripheral surface of case 47, the entire outer peripheral wall surface of slider 41 cannot be brought into sliding-contact (wall-contact) with the inner peripheral surface of case 47. Hence, it is possible to reduce a sliding-contact resistance to relative motion between slider 41 and case 47.

Third Embodiment

The backlash adjuster of the third embodiment is hereinafter described in detail. The fundamental construction of the backlash adjuster of the third embodiment is similar to that of the first embodiment. The same reference signs used to designate components in the backlash adjuster shown in FIG. 8 will be applied to the corresponding reference signs used in the third embodiment shown in FIG. 10, for the purpose of comparison of the two different embodiments. Thus, only the construction of the third embodiment different from the first embodiment is hereunder explained.

Figure 10:
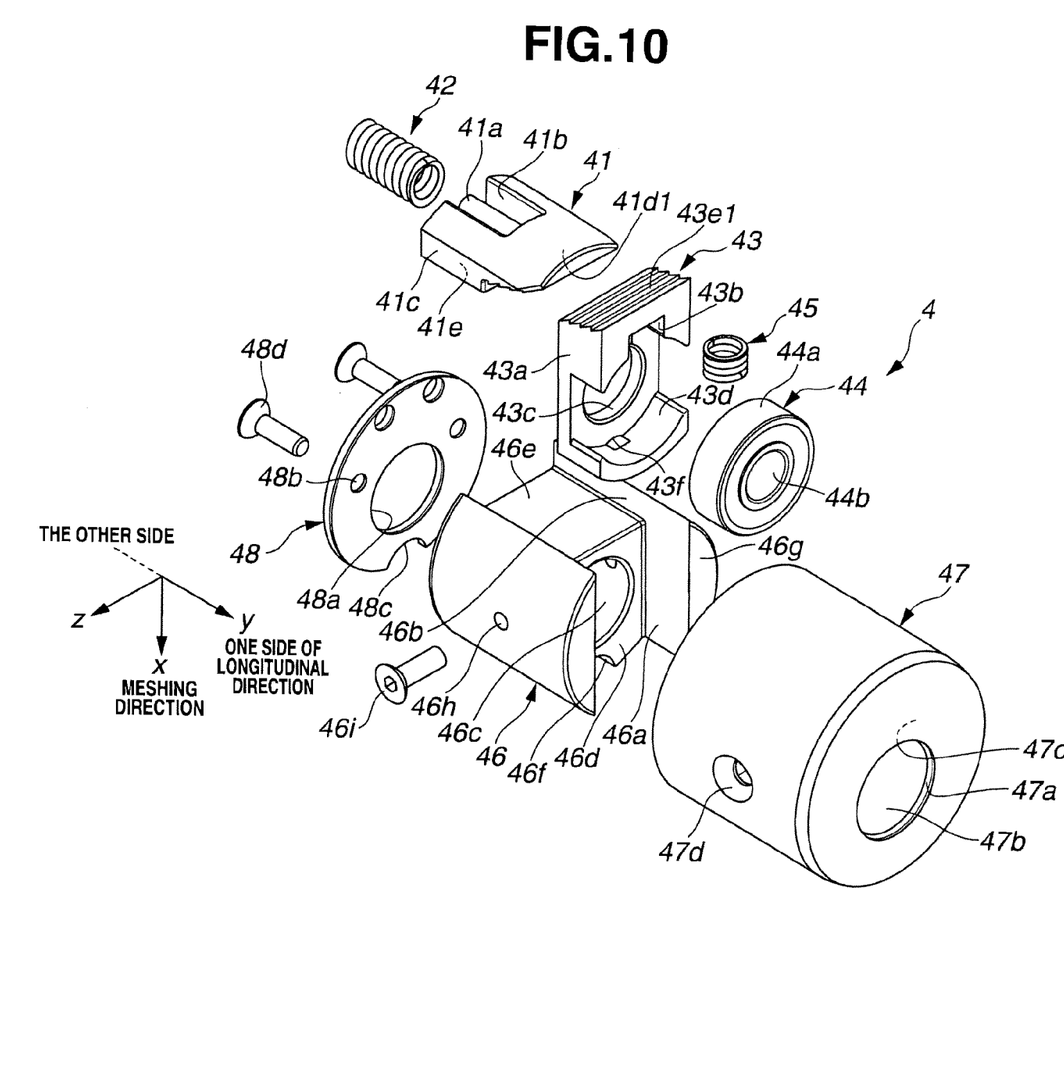
FIG. 10 is a disassembled perspective view illustrating the backlash adjuster of the third embodiment.

Referring now to FIG. 10, there is shown the disassembled perspective view illustrating the backlash adjuster of the third embodiment.

The outer peripheral surface (i.e., the upside, viewing FIG. 8) of slider 41 of the first embodiment is configured as a smooth surface, brought into wall-contact with the inner peripheral surface 47b of the cylindrical-hollow case 47, when assembling, and also an irreversibility of motion transmission between slider 41 and guide member 43 has been created and ensured by setting the inclination angle of the sliding pair, constructed by the slider-side tapered abutting surface 41d and the guide-member-side tapered abutting surface 43e to the given angle. In contrast, the backlash adjuster of the third embodiment of FIG. 10 is different from that of the first embodiment of FIG. 8, in that in the backlash adjuster of the third embodiment the abutting surfaces of slider 41 and guide member 43 are configured as a ratchet structure. As such a ratchet structure, in the third embodiment, a slider-side abutting surface 41d1, inclined with respect to the longitudinal direction, is formed with a plurality of ratchet teeth, each having a tooth face extending in a direction (a tooth-width direction) perpendicular to a direction of sliding motion of slider 41 (i.e., the longitudinal direction). In a similar manner, a guide-member-side abutting surface 43e1, inclined with respect to the longitudinal direction, is formed with a plurality of ratchet teeth, each having a tooth face extending in a direction (a tooth-width direction) perpendicular to a direction of sliding motion of slider 41 (i.e., the longitudinal direction). The slider-side abutting surface 41d1, inclined with respect to the longitudinal direction and formed with a plurality of ratchet teeth, and the guide-member-side abutting surface 43e1, inclined with respect to the longitudinal direction and formed with a plurality of ratchet teeth both construct the ratchet structure. For instance, when slider 41 is forced toward the one side of the longitudinal direction owing to an increase in backlash of worm gear 2, caused by wear of the worm wheel 22, the ratchet structure (41d1, 43e1) acts to permit the ratchet-toothed portion of the slider-side abutting surface 41d1 to relocate or move toward the one side of the longitudinal direction relatively to the ratchet-toothed portion of the guide-member-side abutting surface 43e1 while riding over the ratchet-toothed portion of the guide-member-side abutting surface 43e1. In contrast, when slider 41 is forced toward the other side of the longitudinal direction, the ratchet structure (41d1, 43e1) acts to restrict or prevent the ratchet-toothed portion of the slider-side abutting surface 41d1 from relocating or moving toward the other side of the longitudinal direction by meshed-engagement between the ratchet-toothed portion of the slider-side abutting surface 41d1 and the ratchet-toothed portion of the guide-member-side abutting surface 43e1. Thus, the ratchet structure (41d1, 43e1) of the third embodiment can provide a more certain irreversibility in comparison with the irreversibility obtained by the relationship between the inclination angle of the tapered abutting surfaces 41d and 43e set to the given angle and friction between the tapered abutting surfaces 41d and 43e in the backlash adjuster of the first embodiment. With the more certain irreversibility, obtained by the ratchet structure of the third embodiment, a relative-position relation between guide member 43 and worm shaft 21 can be kept constant, thereby keeping an appropriate meshing state of worm gear 2 (worm wheel 22 and worm shaft 21 in mesh with each other).

The effects, obtained by the third embodiment, are hereinafter enumerated.

(3-1-(14))

According to one aspect of the third embodiment, a power steering device includes a rack-and-pinion steering gear R/P1 (a steering mechanism) having a steering shaft 1 connected to a steering wheel ST and adapted to transmit a movement of the steering wheel ST to steered road wheels, an electric motor M configured to apply a steering assist force to the rack-and-pinion steering gear R/P1, a speed reducer installed between the rack-and-pinion steering gear R/P1 and the electric motor M, and comprising a worm gear 2, the worm gear being constructed by a worm shaft 21 whose one axial end is connected to the electric motor M and a worm wheel 22 in mesh with the worm shaft 21 for transmitting torque of the electric motor M to the steering shaft 1, a gear housing 3 having a worm-wheel housing section 31 in which the worm wheel 22 is housed and a worm-shaft housing section 32 in which the worm shaft 21 is housed, a slider 41 arranged at the other axial end of the worm shaft 21 housed in the worm-shaft housing section 32 of the gear housing 3 and configured to be movable in a longitudinal direction of the worm shaft 21, a biasing member 42 configured to bias the slider 41 toward one side of the longitudinal direction of the worm shaft 21, and a guide member 43 configured to bias the worm shaft 21 in a direction for meshing with the worm wheel 22 by a movement of the worm shaft 21 in the meshing direction that the worm shaft 21 approaches a rotation center of the worm wheel 22 with a movement of the slider 41 toward the one side of the longitudinal direction, and also configured to restrict a movement of the worm shaft 21 in a direction opposite to the meshing direction of the worm shaft 21. In the power steering device, abutting surfaces of the slider 41 and the guide member 43 are configured to have a ratchet structure (41d1, 43e1).

The abutting surfaces of slider 41 and guide member 43, configured as the ratchet structure, can provide a more certain irreversibility of motion transmission between the abutting surfaces of slider 41 and guide member 43.

[Other Modifications]

For instance, a modified backlash adjuster may be configured to have both the ratchet structure of the third embodiment constructed by the ratchet-toothed slider-side abutting surface 41d1 and the ratchet-toothed guide-member-side abutting surface 43e1 and the slider structure of the second embodiment integrally formed with the sliding-clearance management protruding portion 60.

In the shown embodiments, a compression coil spring is exemplified as a biasing member 42. In lieu thereof, an elastically-deformable rubber bushing or an elastically-deformable coned disc spring may be used.

The entire contents of Japanese Patent Application No. 2012-281044 (filed Dec. 25, 2012) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A power steering device comprising:
a steering mechanism having a steering shaft connected to a steering wheel and adapted to transmit a movement of the steering wheel to steered road wheels;
an electric motor configured to apply a steering assist force to the steering mechanism;
a speed reducer installed between the steering mechanism and the electric motor, and comprising a worm gear, the worm gear being constructed by a worm shaft whose one axial end is connected to the electric motor and a worm wheel in mesh with the worm shaft for transmitting torque of the electric motor to the steering shaft;
a gear housing having a worm-wheel housing section in which the worm wheel is housed and a worm-shaft housing section in which the worm shaft is housed;
a slider arranged at the other axial end of the worm shaft housed in the worm-shaft housing section of the gear housing and configured to be movable in a longitudinal direction of the worm shaft;
a biasing member configured to bias the slider toward one side of the longitudinal direction of the worm shaft; and
a guide member configured to bias the worm shaft in a direction for meshing with the worm wheel by a movement of the worm shaft in the meshing direction that the worm shaft approaches a rotation center of the worm wheel with a movement of the slider toward the one side of the longitudinal direction, and also configured to restrict a movement of the worm shaft in a direction opposite to the meshing direction of the worm shaft.

2. The power steering device as recited in claim 1, further comprising:
a rolling bearing configured to rotatably support the other axial end of the worm shaft,
wherein the guide member is configured to bias the worm shaft in the meshing direction via the rolling bearing.

3. The power steering device as recited in claim further comprising:
a sliding mechanism arranged radially outside of the rolling bearing for permitting a movement of the rolling bearing in the meshing direction, and for restricting a movement of the rolling bearing in a direction of a rotation axis of the worm wheel.

4. The power steering device as recited in claim 3, further comprising:
a case configured to house the slider, the guide member, and the sliding mechanism.

5. The power steering device as recited in claim 2, further comprising:
a guiding mechanism configured to restrict a movement of the slider in a direction of rotation of the worm shaft.

6. The power steering device as recited in claim 2, further comprising:
a guiding mechanism configured to restrict a movement of the slider in the meshing direction.

7. The power steering device as recited in claim 2, further comprising:
a case configured to restrict a movement of the slider in the direction opposite to the meshing direction.

8. The power steering device as recited in claim 7, wherein:
the slider has at least one protruding portion formed on an outer peripheral surface opposing to an inner peripheral surface of the case and arranged radially outwards with respect to a rotation axis of the worm shaft used as a reference.

9. The power steering device as recited in claim 8, wherein:
the slider and the protruding portion are integrally formed from a synthetic resin material.

10. The power steering device as recited in claim 8, wherein:
the protruding portion is arranged on the one side of the longitudinal direction of the slider.

11. The power steering device as recited in claim 2, further comprising:
a pin member,
wherein the biasing member is constructed by a coil spring, and the pin member is configured to restrict a movement of the slider in a direction of rotation of the worm shaft and suppress an inclination of the coil spring.

12. The power steering device as recited in claim 1, wherein:
the guide member is configured such that a movement of the guide member in the direction opposite to the meshing direction is restricted even in an abutting state of the steering wheel turned to a maximum steering-wheel angular displacement.

13. The power steering device as recited in claim 1, wherein:
the slider and the guide member have respective abutting surfaces brought into abutting-engagement with each other, and the abutting surfaces are configured as tapered abutting surfaces inclined with respect to a direction of movement of the slider.

14. The power steering device as recited in claim 1, wherein:
abutting surfaces of the slider and the guide member are configured to have a ratchet structure.

15. A backlash adjuster for adjusting backlash of a worm gear configured to transmit torque of an electric motor to a steering mechanism adapted to transmit a movement of a steering wheel to steered road wheels, the worm gear being constructed by a worm shaft and a worm wheel, the backlash adjuster comprising:

a slider installed on a gear housing of the worm gear and configured to be movable in a longitudinal direction of the worm shaft;

a biasing member configured to bias the slider toward one side of the longitudinal direction of the worm shaft; and a guide member configured to bias the worm shaft in a direction for meshing with the worm wheel by a movement of the worm shaft in the meshing direction that the worm shaft approaches a rotation center of the worm wheel with a movement of the slider toward the one side of the longitudinal direction, and also configured to restrict a movement of the worm shaft in a direction opposite to the meshing direction of the worm shaft.

16. The backlash adjuster as recited in claim 15, further comprising:

a rolling bearing configured to rotatably support the other axial end of the worm shaft, wherein the guide member is configured to bias the worm shaft in the meshing direction via the rolling bearing.

17. The backlash adjuster as recited in claim 16, further comprising:

a sliding mechanism arranged radially outside of the rolling bearing for permitting a movement of the rolling bearing in the meshing direction, and for restricting a movement of the rolling bearing in a direction of a rotation axis of the worm wheel.

18. The backlash adjuster as recited in claim 17, further comprising:

a case configured to house the slider, the guide member, and the sliding mechanism.

19. The backlash adjuster as recited in claim 16, wherein:

the slider has at least one protruding portion formed on an outer peripheral surface opposing to an inner peripheral surface of the case and arranged radially outwards with respect to a rotation axis of the worm shaft used as a reference.

20. The backlash adjuster as recited in claim 15, wherein:

the guide member is configured such that a movement of the guide member in the direction opposite to the meshing direction is restricted even in an abutting state of the steering wheel turned to a maximum steering-wheel angular displacement.

\* \* \* \* \*